US012349627B2

(12) United States Patent
Shimomura (10) Patent No.: US 12,349,627 B2
(45) Date of Patent: Jul. 8, 2025

(54) HARVESTING DEVICE FOR PLUCKING OR CUTTING FRUIT BASED ON PEDICEL ANGLE

(71) Applicant: Panasonic Intellectual Property Management Co., Ltd., Osaka (JP)

(72) Inventor: Keiichiro Shimomura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 468 days.

(21) Appl. No.: 17/815,269

(22) Filed: Jul. 27, 2022

(65) Prior Publication Data

US 2023/0060138 A1    Mar. 2, 2023

(30) Foreign Application Priority Data

Aug. 27, 2021    (JP) .................................. 2021-138982

(51) Int. Cl.
*A01D 46/24*    (2006.01)
*A01D 46/30*    (2006.01)

(52) U.S. Cl.
CPC ............ *A01D 46/24* (2013.01); *A01D 46/30* (2013.01)

(58) Field of Classification Search
CPC ...... A01D 46/30; A01D 46/24; A01D 46/253; A01G 3/088
See application file for complete search history.

(56) References Cited

U.S. PATENT DOCUMENTS

| 4,519,193 A * | 5/1985 | Yoshida ................... B25J 9/046 348/89 |
| 5,544,474 A * | 8/1996 | Finkelstein ............ A01D 46/30 56/10.2 A |
| 11,206,764 B1 * | 12/2021 | Mazor .................... A01D 46/30 |
| 2016/0050852 A1 * | 2/2016 | Lee .......................... B25J 9/023 901/41 |
| 2019/0261565 A1 * | 8/2019 | Robertson ............ A01D 46/253 |
| 2021/0045290 A1 * | 2/2021 | Takemura .............. B25J 13/081 |
| 2023/0068237 A1 * | 3/2023 | Knopf ..................... B25J 15/10 |
| 2023/0247941 A1 * | 8/2023 | Mazor .................. B25J 15/0019 56/229 |

FOREIGN PATENT DOCUMENTS

| EP | 3138379 A1 | 3/2017 |
| EP | 3138380 | 3/2017 |
| JP | 60-149314 | 8/1985 |
| JP | 62-044117 | 2/1987 |
| JP | 8-056459 | 3/1996 |
| JP | 2000-262128 | 9/2000 |
| JP | 2017-051103 | 3/2017 |
| JP | 2017-051104 A | 3/2017 |
| JP | 2020-174536 A | 10/2020 |

* cited by examiner

Primary Examiner — Joseph M Rocca
Assistant Examiner — Julia C Tran
(74) Attorney, Agent, or Firm — Rimon P.C.

(57) ABSTRACT

A harvesting device includes: an upper harvest ring that an object grown on a plant is to be inserted into; a lower harvest ring that is disposed below the upper harvest ring and that the object is to be inserted into; a first drive mechanism that moves at least one of the upper harvest ring and the lower harvest ring; and a controller. The controller determines one of a first harvest operation and a second harvest operation, and controls the first drive mechanism, based on the one of the first harvest operation and the second harvest operation.

11 Claims, 11 Drawing Sheets

HARVESTING DEVICE FOR PLUCKING OR CUTTING FRUIT BASED ON PEDICEL ANGLE

BACKGROUND

1. Technical Field

The present disclosure relates to a harvesting device that harvests an object such as a fruit.

2. Description of the Related Art

Harvesting work of crops has been desired to be automated. Conventionally, as a device that performs automated harvesting, for example, a harvesting device described in PTL 1 is known. The harvesting device disclosed in PTL 1 includes: an upper harvest ring having a ring portion into which an object is to be inserted; a lower harvest ring disposed below the upper harvest ring and having a ring portion into which the object is to be inserted; and a drive mechanism that changes a relative position between the upper harvest ring and the lower harvest ring in a state where a part of the object is inserted in the upper harvest ring and the lower harvest ring. The drive mechanism moves the upper harvest ring in a direction away from a plant on which the object is grown or moves the lower harvest ring in a direction toward the plant, so that the harvesting device can pluck, separating the object by wrenching.

CITATION LIST

Patent Literature

PTL 1: Unexamined Japanese Patent Publication No. 2017-051103

SUMMARY

A harvesting device according to one aspect of the present disclosure includes: an upper harvest ring that an object grown on plant is to be inserted into; a lower harvest ring that is disposed below the upper harvest ring and that the object is to be inserted into; a first drive mechanism that moves at least one of the upper harvest ring and the lower harvest ring; and a controller. The controller determines one of a first harvest operation and a second harvest operation, and controls the first drive mechanism, based on the one of the first harvest operation and the second harvest operation.

DETAILED DESCRIPTIONS

Hereinafter, an exemplary embodiment of the present disclosure will be described in detail with reference to the drawings.

In the technique disclosed in PTL 1, depending on a bending angle of a fruit stem (hereinafter, referred to as a pedicel), it is impossible to harvest by a harvest method of separating by plucking, and it is not possible to harvest all the object grown in a bunch. In particular, in the case of a fruit having a large bending angle of a pedicel, force such as pulling force, twisting force, or bending force applied by the harvesting device is not adequately applied to the abscission layer, and it is often impossible to harvest the fruit. Therefore, a harvesting device capable of solving these problems will be described. An object of the present disclosure is to provide a harvesting device capable of more reliably harvesting an object grown in a bunch.

Figure 1:
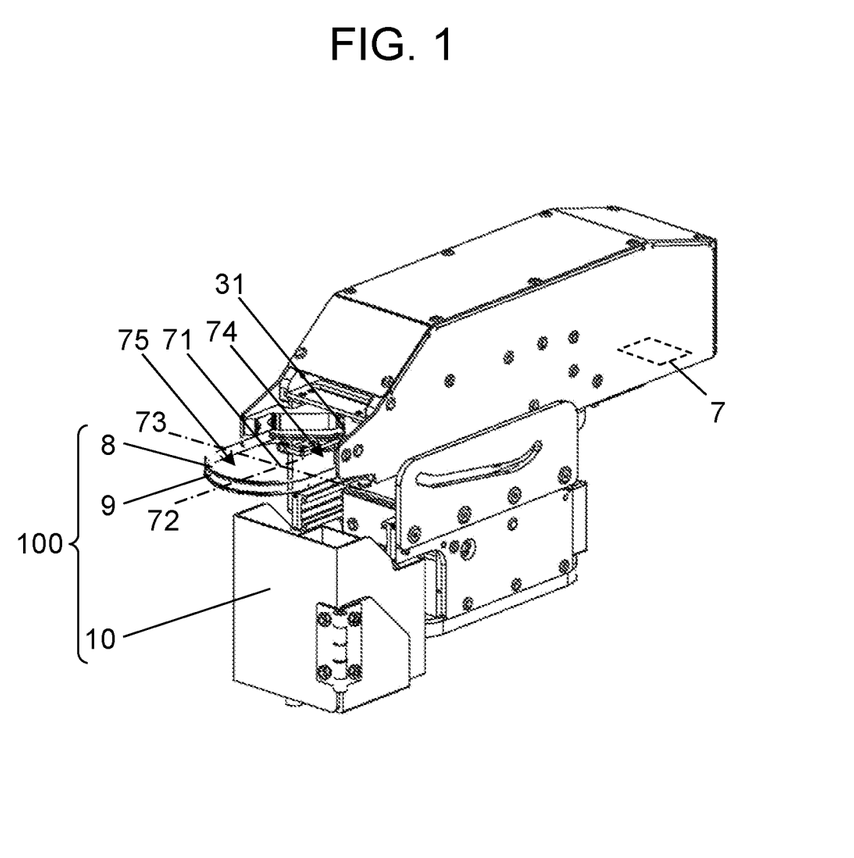
FIG. 1 is a perspective view illustrating an appearance of a harvesting device according to an exemplary embodiment of the present disclosure.

FIG. 1 is a perspective view illustrating an appearance of harvesting device 100 according to the exemplary embodiment of the present disclosure. With reference to FIG. 1, harvesting device 100 includes: a harvesting mechanism (upper harvest ring 8, lower harvest ring 9, and the like) for separating a fruit not at a calyx but at an abscission layer; a mechanism for cutting a pedicel that is moved to cutting position 63 (see FIG. 6) and is constrained; and controller 7. Controller 7 controls various operations of harvesting device 100.

In the following descriptions, the vertical direction is the direction parallel to the gravity, the downward direction is the direction in which the earth's gravity pulls fruits and the like, and the upward direction is the direction opposite to the downward direction. In addition, the forward-and-rearward direction is the direction in which the fruit is coming close or away to or from harvesting device 100, the forward direction is the direction in which harvesting device 100 get close to the fruit, and the rearward direction is the direction in which harvesting device 100 comes away from the fruit.

A harvesting object of harvesting device 100 is a fruit or the like that has grown on a branch. More specifically, the harvesting object is a fruit having a peduncle and an abscission layer. Examples of such a fruit include strawberry, blueberry, raspberry, and the like, in addition to tomato.

Figure 2:
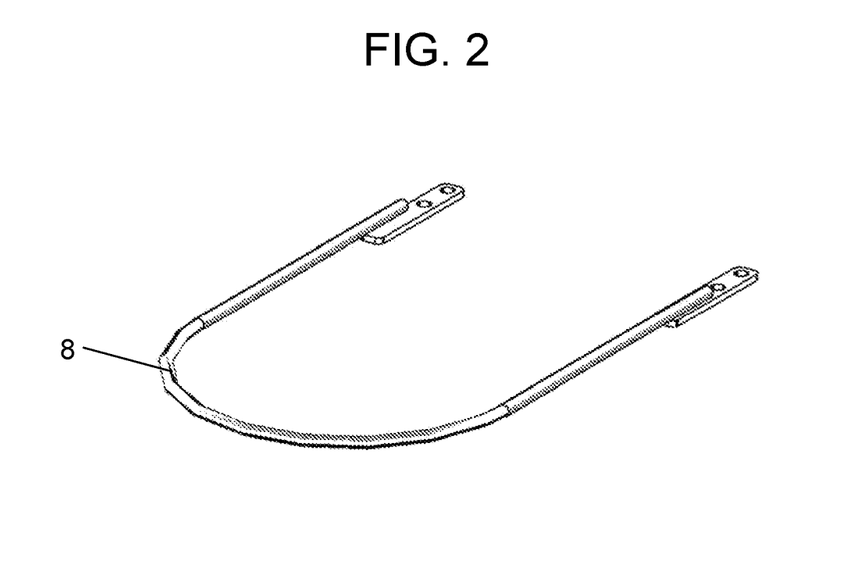
FIG. 2 is a perspective view illustrating an appearance of an upper harvest ring.
Figure 3:
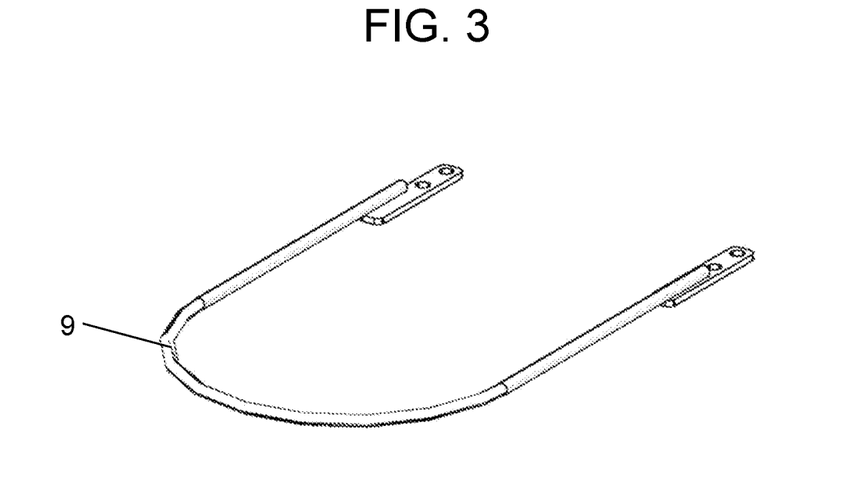
FIG. 3 is a perspective view illustrating an appearance of a lower harvest ring.

Upper harvest ring 8 (see FIG. 2) and lower harvest ring 9 (see FIG. 3) disposed vertically below upper harvest ring 8 are mechanisms for inserting an object therethrough to harvest a desired fruit. Upper harvest ring 8 and lower harvest ring 9 are each a member having a U-shaped curve at its end, and parts similar to upper harvest ring 8 and lower harvest ring 9 may be used.

Figure 4:
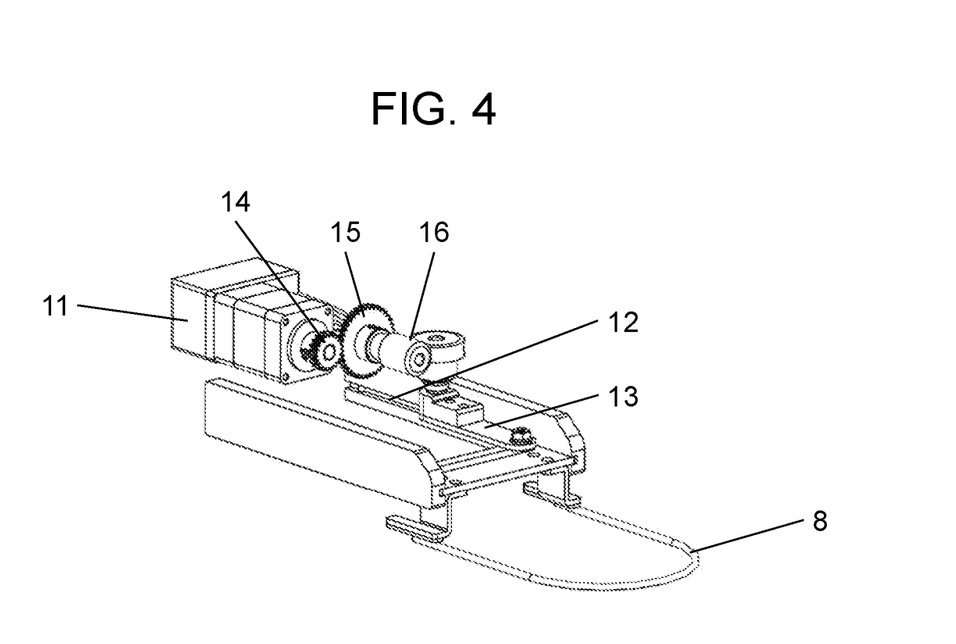
FIG. 4 is a perspective view illustrating a configuration of an operation portion for the upper harvest ring.

FIG. 4 is a perspective view illustrating an operation portion for upper harvest ring 8 of harvesting device 100 of FIG. 1. A rotation shaft of motor 11 is connected to upper harvest ring 8 via spur gears 14, 15, worm gear 16, and arm 13. When motor 11 rotates, arm 13 moves upper harvest ring 8 in the forward-and-rearward direction along guide groove 12. That is, motor 11 causes upper harvest ring 8 to move frontward and rearward. The operation portion for upper harvest ring 8 is an example of a first drive mechanism of the present disclosure.

Figure 5:
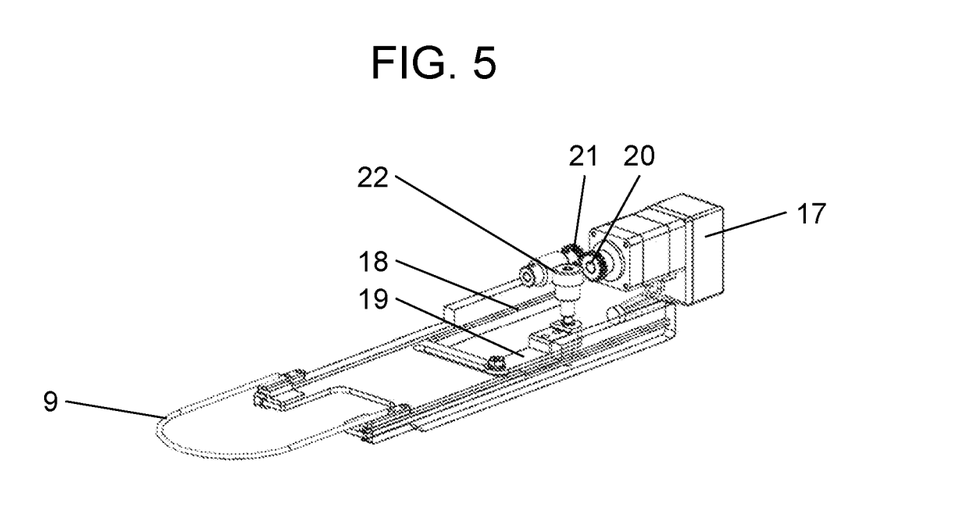
FIG. 5 is a perspective view illustrating a configuration of an operation portion for the lower harvest ring.

FIG. 5 is a perspective view illustrating an operation portion for lower harvest ring 9 of harvesting device 100 of FIG. 1. A rotation shaft of motor 17 is connected to lower harvest ring 9 via spur gears 20, 21, worm gear 22, and arm 19. When motor 17 rotates, arm 19 moves lower harvest ring 9 in the forward-and-rearward direction along guide groove 18. That is, motor 17 causes lower harvest ring 9 to move frontward and rearward. The operation portion for lower harvest ring 9 is an example of the first drive mechanism of the present disclosure.

Figure 6:
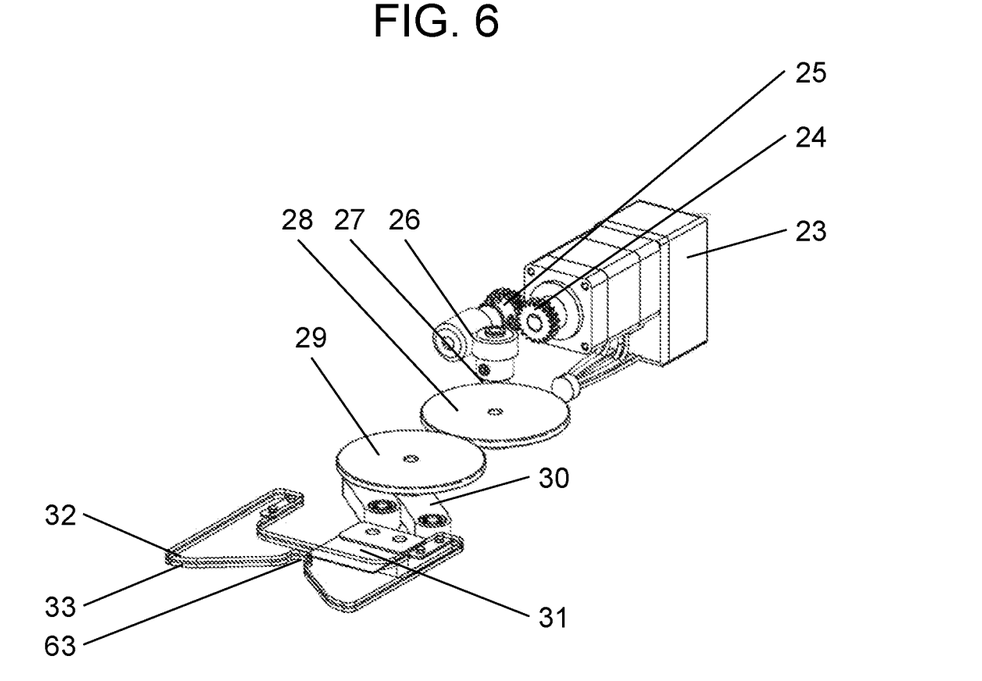
FIG. 6 is a perspective view illustrating a configuration of a cutting operation portion.

FIG. 6 is a perspective view illustrating a cutting operation portion of harvesting device 100 of FIG. 1. A rotation shaft of motor 23 is connected to cutting blade 31 via spur gears 24, 25, worm gear 26, spur gears 27, 28, 29, and parallel link 30. Cutting blade 31 is positioned between cutting blade guides 32, 33. Cutting blade guides 32, 33 have recesses (cutting position 63) along the forward-and-rearward direction. When motor 23 rotates, parallel link 30 rotates about a rotation shaft of spur gear 29, and cutting blade 31 operates at cutting position 63 while drawing an arc. The cutting operation portion is an example of a second drive mechanism of the present disclosure.

The cutting blade 31 may be arranged in an interior of upper harvest ring 8 and lower harvest ring 9 when harvesting device 100 is viewed from above. As illustrated in FIG. 1, the interior of upper harvest ring 8 and lower harvest ring 9 has center point 71. Reference line 72 is defined to pass through center point 71 and a location of a plant. Boundary line 73 is defined to perpendicularly intersect reference line 72 and to pass through center point 71. The interior of upper harvest ring 8 and lower harvest ring 9 includes the following two areas: first area 74 that is more distant from the plant than boundary line 73 is; and second area 75 that is closer to the plant than the boundary line 73 is. Cutting blade 31 may be disposed in first area 74.

Figure 7:
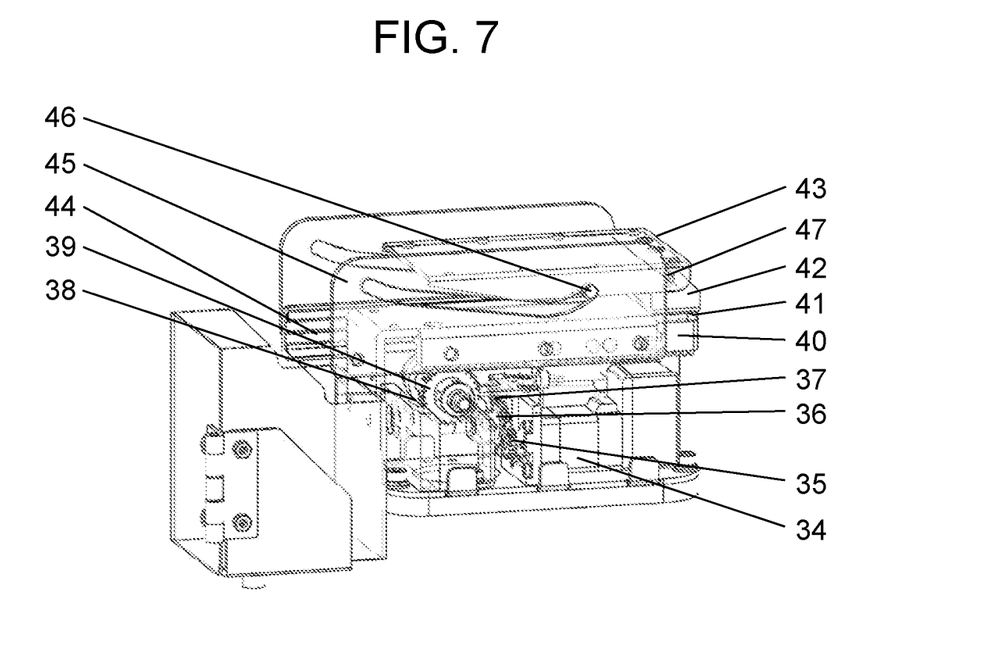
FIG. 7 is a perspective view illustrating a configuration of a ring vertical operation portion.

FIG. 7 is a perspective view illustrating a ring vertical operation portion of harvesting device 100 of FIG. 1. A rotation shaft of motor 34 is connected to linear rack 40 via spur gears 35, 36, 37, worm gear 38, and spur gear 39. Linear rack 40 is connected to slide base 41 and rotation base 42. When motor 34 rotates, linear rack 40 slides in the forward-and-rearward direction along linear guide 44. Harvest portion base 43 is connected to rotation base 42 via rotation shaft 47, on the rear side of harvest portion base 43. Harvest portion base 43 has cam followers 46 on both left and right sides of the front side of harvest portion base 43. Cam followers 46 are located inside respective ones of the cam grooves of cam plates 45. A harvest portion (upper harvest ring operation portion, lower harvest ring operation portion, and cutting portion) is disposed above harvest portion base 43 (not shown). When slide base 41 moves in the forward direction, a rear side (rotation shaft side) of harvest portion base 43 moves parallel to linear guide 44, and, with respect to a front side (cam follower side) of harvest portion base 43, cam followers 46 operate along cam grooves of cam plates 45. Accompanying the movement of harvest portion base 43, the harvest portion moves vertically, thereby realizing the vertical operation of tips of upper harvest ring 8 and lower harvest ring 9.

Figure 8:
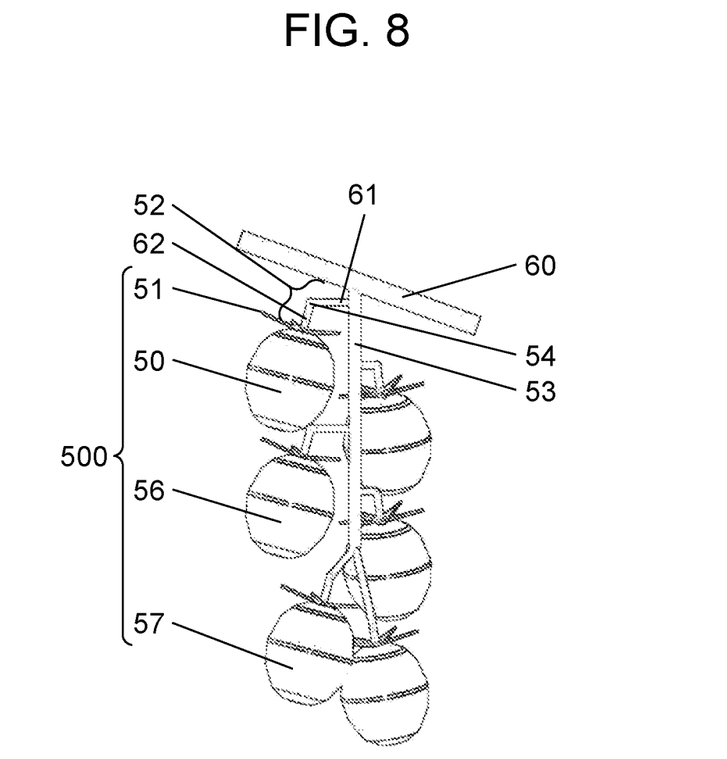
FIG. 8 is a diagram illustrating a bunch of fruits that are objects to be harvested.

FIG. 8 illustrates a bunch of fruits that are objects to be harvested. In the description, tomato exemplifies a fruit.

Bunch 500 branching from main stem 60, which is an example of a branch, has a plurality of fruits grown around peduncle 53. Fruit 50 has calyx 51, and calyx 51 is connected to peduncle 53 via pedicel 52. Pedicel 52 includes first pedicel 61 and second pedicel 62. Pedicel 52 is connected from peduncle 53 to first pedicel 61, is bent, and is connected from second pedicel 62 to calyx 51. Pedicel 52 has characteristics to be easily separated at a connection point where pedicel 52 is bent between first pedicel 61 and second pedicel 62. An upper part of peduncle 53 is further connected to main stem 60. Bunch 500 hangs down from main stem 60 by its own weight or the like.

Abscission layer 54 is a special cell layer formed between a branch and a shank of a fruit, and is a portion that is located in the middle of pedicel 52 and can be relatively easily separated by a pulling force or the like. Between fruit 50 and peduncle 53, in addition to abscission layer 54, there is a boundary between calyx 51 and fruit 50 as a portion that is easily separated. Therefore, when fruit 50 is simply pulled, fruit 50 is separated at abscission layer 54 in some cases, and fruit 50 is separated at calyx 51 in the other cases.

Figure 9:
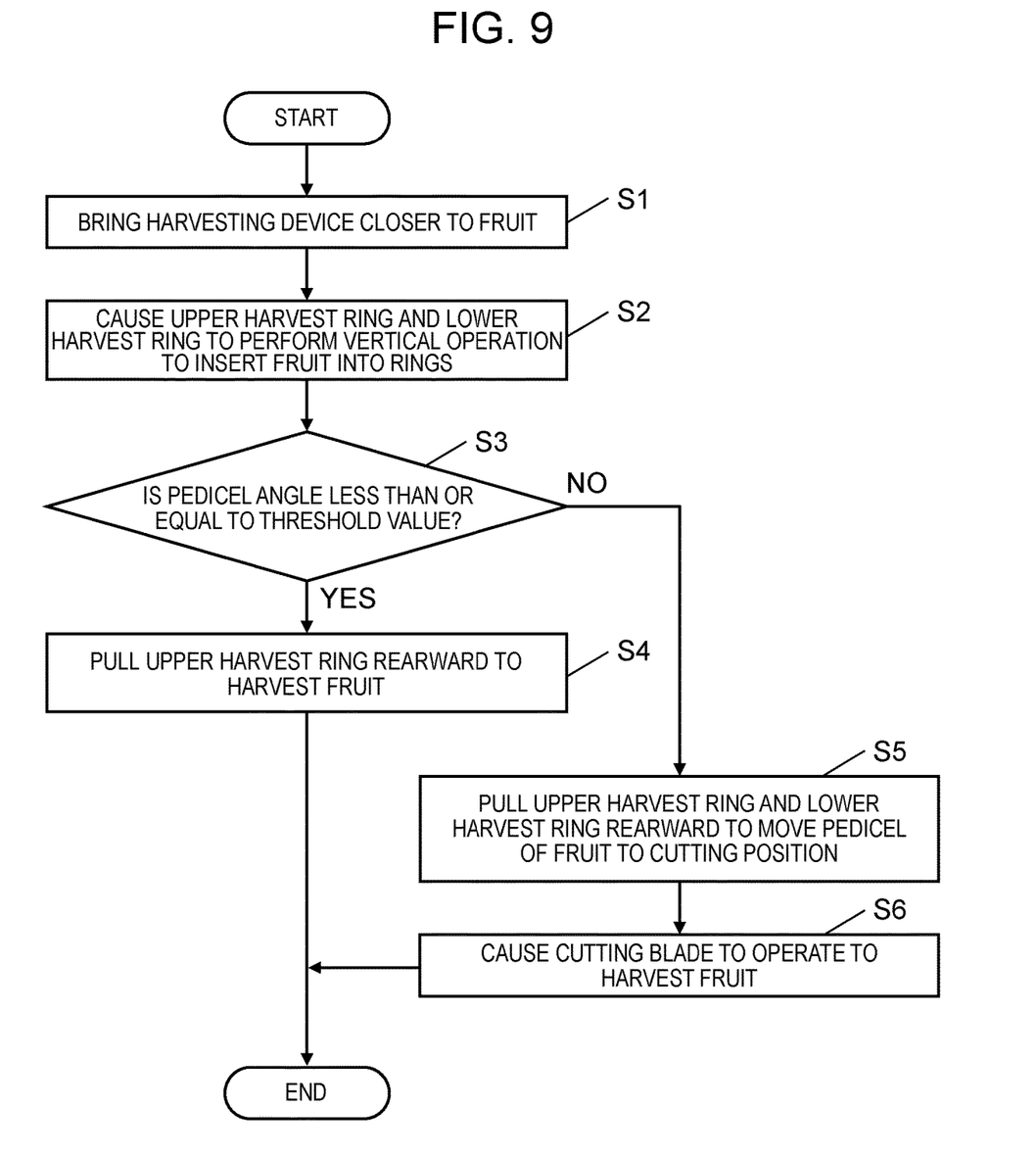
FIG. 9 is a flowchart illustrating an operation procedure of the harvesting device to more reliably separate a fruit at an abscission layer.
Figure 15:
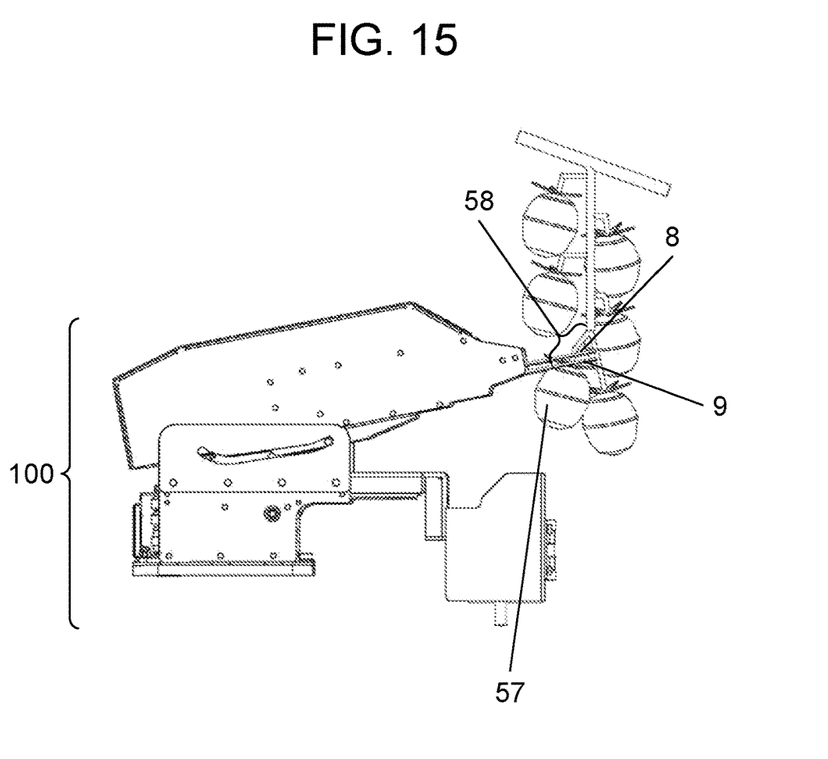
FIG. 15 is an explanatory diagram of an operation until the harvesting device inserts a fruit into the interior of the upper and lower harvest rings.
Figure 16:
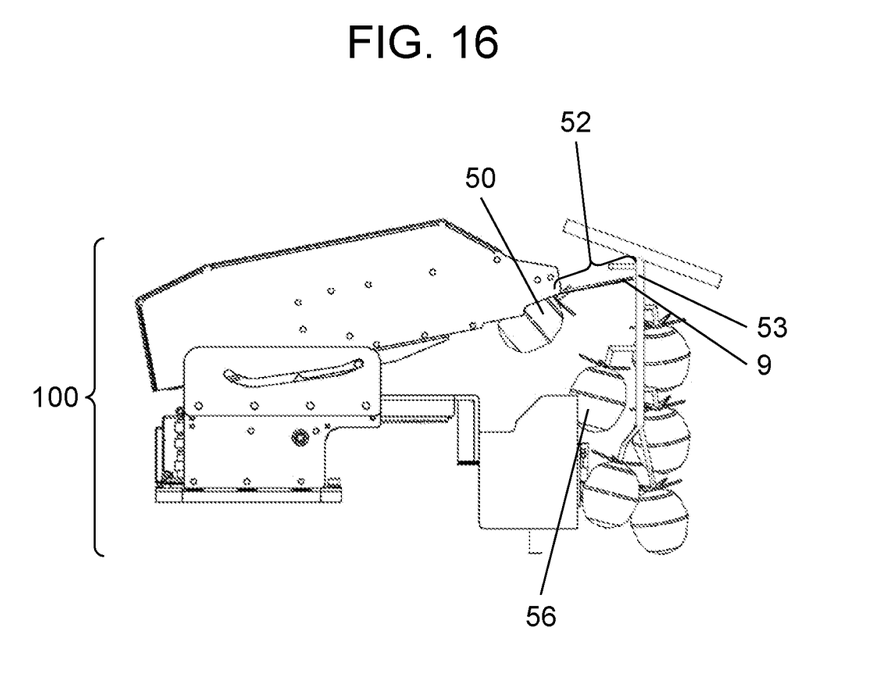
FIG. 16 is an explanatory diagram of an operation when the harvesting device harvests by a plucking operation.
Figure 17:
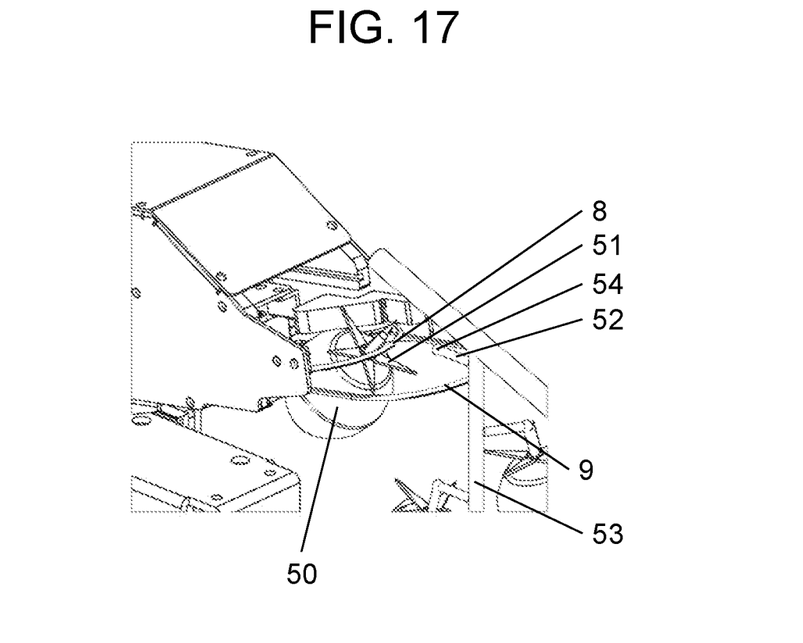
FIG. 17 is an explanatory diagram of an operation when the harvesting device harvests by the plucking operation.
Figure 18:
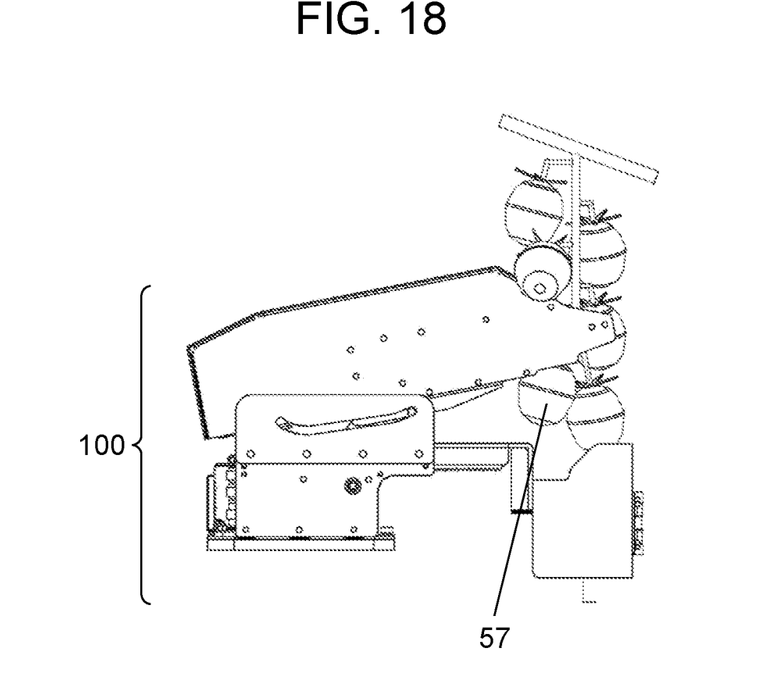
FIG. 18 is an explanatory diagram of an operation when the harvesting device harvests by a cutting operation.
Figure 19:
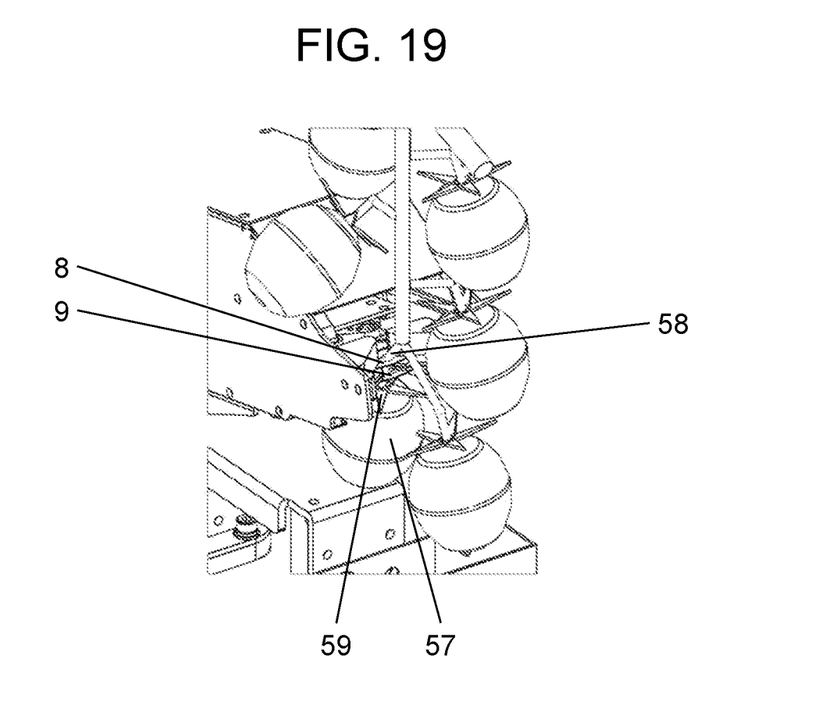
FIG. 19 is an explanatory diagram of an operation when the harvesting device harvests by the cutting operation.

Next, with reference to FIGS. 9 to 19, a description will be given on an operation of harvesting device 100 for more reliably separating fruit 50 at abscission layer 54. FIG. 9 is a flowchart illustrating an operation procedure of the harvesting device for more reliably separating a fruit at an abscission layer. FIGS. 10 to 15 are explanatory diagrams of an operation when harvesting device 100 inserts a fruit into the interior of upper harvest ring 8 and lower harvest ring 9. FIGS. 16 and 17 are explanatory diagrams of an operation when harvesting device 100 harvests by the plucking operation. FIGS. 18 and 19 are explanatory diagrams of an operation when harvesting device 100 harvests by the cutting operation. The desired fruit is fruit 50.

Figure 10:
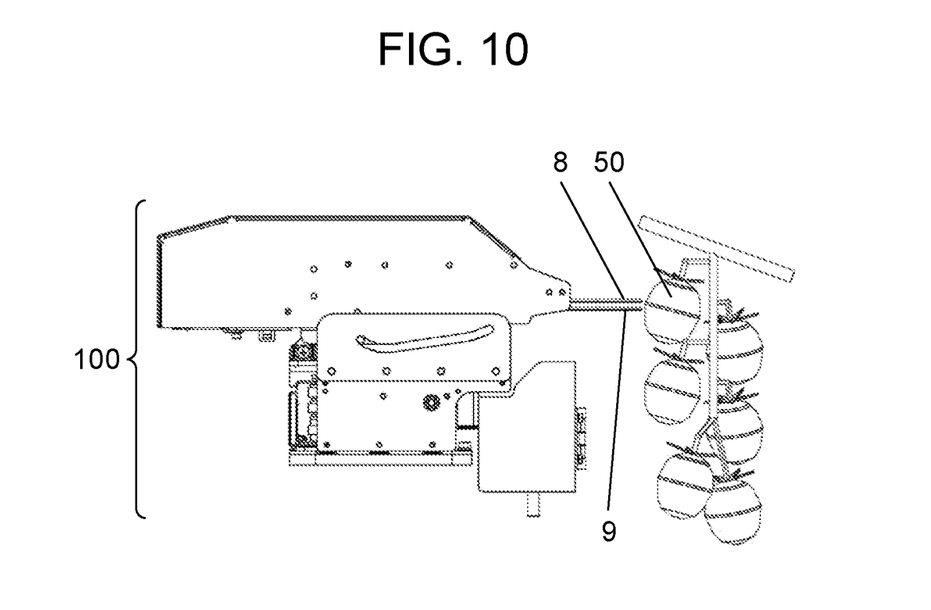
FIG. 10 is an explanatory diagram of an operation until the harvesting device inserts a fruit into an interior of the upper and lower harvest rings.
Figure 11:
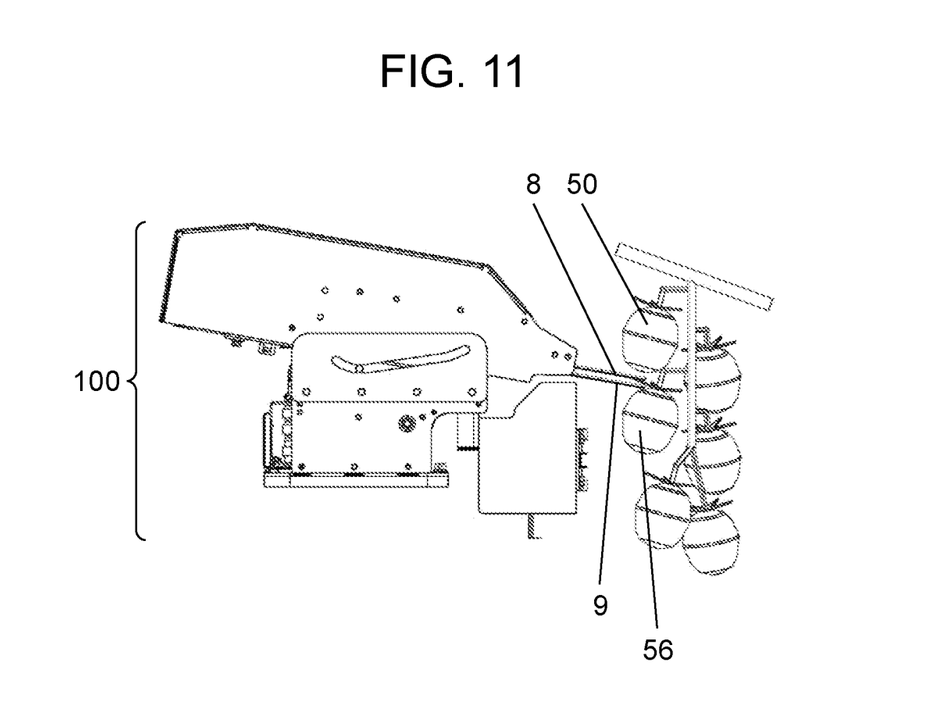
FIG. 11 is an explanatory diagram of an operation until the harvesting device inserts a fruit into the interior of the upper and lower harvest rings.
Figure 12:
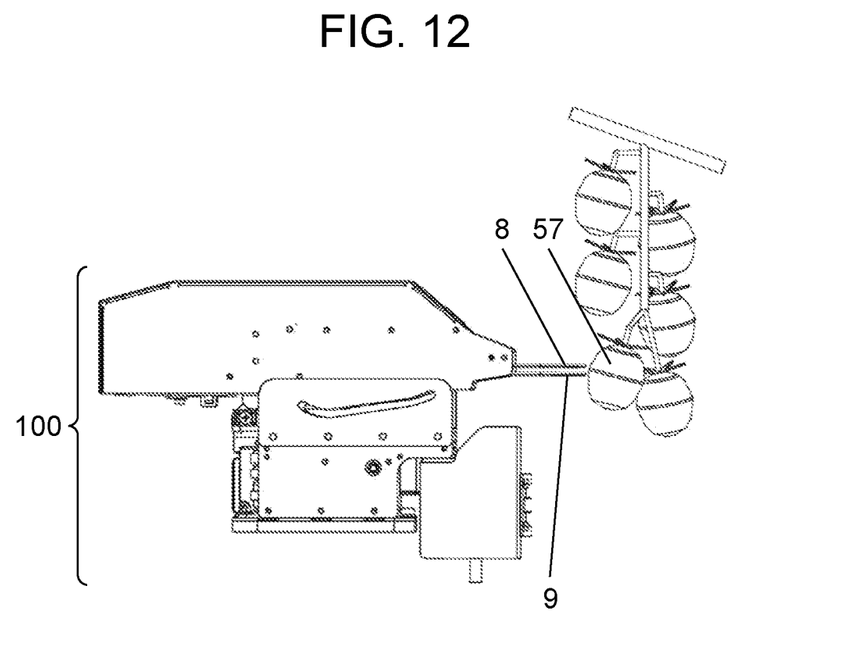
FIG. 12 is an explanatory diagram of an operation until the harvesting device inserts a fruit into the interior of the upper and lower harvest rings.
Figure 13:
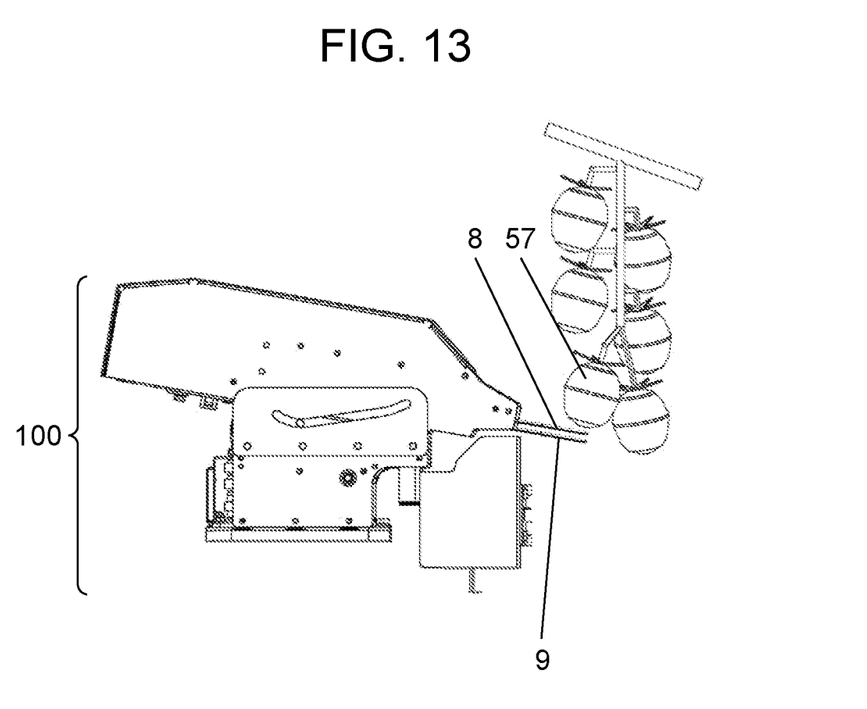
FIG. 13 is an explanatory diagram of an operation until the harvesting device inserts a fruit into the interior of the upper and lower harvest rings.

In step S1 of FIG. 9, controller 7 brings harvesting device 100 closer to fruit 50 that is a harvesting object. Specifically, when fruit 50 is located on an upper part of bunch 500, as shown in FIG. 10, controller 7 positions harvesting device 100 such that, when upper harvest ring 8 and lower harvest ring 9 are parallel to a horizontal plane or are inclined forward, upper harvest ring 8 and lower harvest ring 9 are located between the lower end and the vicinity of the center of fruit 50 in the vertical direction. In addition, as illustrated in FIG. 11, controller 7 adjusts the position of harvesting device 100 such that, when the tips of upper harvest ring 8 and lower harvest ring 9 are located at the lowest point in the vertical operation, the tips are located between fruit 50 and fruit 56 on the lower side of fruit 50. In addition, when fruit 50 is located on a lower part of bunch 500, as illustrated in FIG. 12, controller 7 positions harvesting device 100 such that upper harvest ring 8 and lower harvest ring 9 are located between the lower end and the vicinity of the center of fruit 57 in the vertical direction. In addition, as illustrated in FIG. 13, controller 7 adjusts the position of harvesting device 100 such that, when the tips of upper harvest ring 8 and lower harvest ring 9 are located at the lowest point in the vertical operation, the tips are located between the lower end position of fruit 57 and a position about 20 mm below the lower end. In this manner, by changing, depending on the position of a grown fruit that is a harvesting object, how to bring harvesting device 100 closer, it is more reliably insert the fruit into the interior of the rings in step S2.

Next, in step S2, controller 7 drives upper harvest ring 8 and lower harvest ring 9 such that the fruit is inserted into the interior of the rings of upper harvest ring 8 and lower harvest ring 9.

Figure 14:
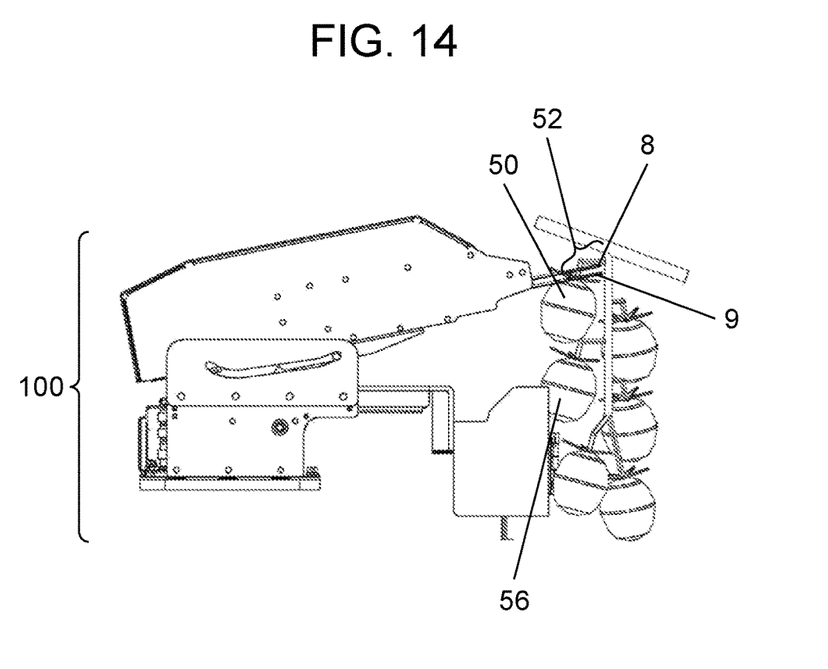
FIG. 14 is an explanatory diagram of an operation until the harvesting device inserts a fruit into the interior of the upper and lower harvest rings.

Specifically, harvesting device 100 moves upper harvest ring 8 and lower harvest ring 9 to pedicel 52 of fruit 50 by reversely rotating motor 34 in the state of FIG. 11 and thereby tilting harvest portion base 43 backward as illustrated in FIG. 14. Here, also when the fruit is located at a lower part of the bunch, harvesting device 100 similarly moves upper harvest ring 8 and lower harvest ring 9 to pedicel 58 of fruit 57 by tilting harvest portion base 43 backward as illustrated in FIG. 15.

Next, in step S3, controller 7 determines whether a pedicel angle is less than or equal to a threshold value. The pedicel angle is the angle formed between first pedicel 61 and second pedicel 62 in FIG. 8. The controller harvests the fruit by plucking when the pedicel angle is less than or equal to a threshold value, and harvests the fruit by cutting when the pedicel angle is more than the threshold value. That is, harvesting device 100 can switch between two types of harvest operations of the plucking operation and the cutting operation, in order to harvest. The threshold value of the pedicel angle is desirably, for example, about 60° to 150°. The harvest operation including the plucking operation is an example of a second harvest operation of the present disclosure, and the harvest operation including the cutting operation is an example of a first harvest operation of the present disclosure.

It is desirable to detect the pedicel angle by image recognition or the like. In general, since fruits at a lower part of a bunch have larger pedicel angles, the determination may be made, for example, as follows. Regardless of the pedicel angle, the cutting operation is performed on the fruits on the bottom to the second or third fruit, and the plucking operation is performed on the fruits above the second or third fruit.

Note that the determination in step S3 may be performed before step S1. In other words, it may be determined before the operation of harvesting device 100 whether to harvest the fruit by plucking or cutting. Also in this case, the operation of harvesting device 100 performed in step S1 and step S2 is the same, and is a common operation between plucking and cutting.

In a case where harvesting is performed by the plucking operation on the basis of the result of the determination in step S3, harvesting device 100 performs a process of step S4.

In step S4, when harvesting device 100 drives motor 11 (see FIG. 4), upper harvest ring 8 is retracted along guide groove 12 (see FIG. 4) by arm 13 (see FIG. 4), as shown in FIG. 16. As a result, upper harvest ring 8 is pulled in a direction (rearward) in which fruit 50 including calyx 51 comes away from peduncle 53. While fruit 50 is pulled, peduncle 53 is also pulled via pedicel 52 and comes into contact with lower harvest ring 9. As a counteraction of a pulling force of upper harvest ring 8, a force pushing peduncle 53 is generated in lower harvest ring 9. At this time, since upper harvest ring 8 is in contact with calyx 51 of fruit 50, a pulling force acts between calyx 51 and peduncle 53 such that the pulling force separates calyx 51 and peduncle 53 from each other, and pedicel 52 is separated at abscission layer 54 as shown in FIGS. 16 and 17. At this time, no pulling force acts between fruit 50 and calyx 51 such that the pulling force separates fruit 50 and calyx 51 from each other, and calyx 51 is therefore not separated from fruit 50. In addition, since harvesting device 100 can be prevented from directly touching fruit 50 during a process of harvesting, fruit 50 can be prevented from being damaged.

By disposing upper harvest ring 8 and lower harvest ring 9 in a stacked manner, it is possible to reduce a rotation moment acting on fruit 50 with respect to peduncle 53 in a separation step in step S4, and fruit 50 can be prevented from getting out of lower harvest ring 9 due to rotation. In addition, it is possible to efficiently apply a pulling force to abscission layer 54, and separation is rarely performed at a place other than abscission layer 54.

In addition, a gap between upper harvest ring 8 and lower harvest ring 9 is preferably, for example, more than or equal to about 0.3 mm and less than or equal to 5 mm in order to reduce the possibility of sandwiching a calyx or the like of another fruit between upper harvest ring 8 and lower harvest ring 9.

After that, harvested fruit 50 with calyx 51 falls and enters collection box 10 in FIG. 1. In a case where harvesting device 100 is caused to function as a harvesting system, it is desirable to dispose a container or the like for collecting harvested fruit 50 like collection box 10.

In the present exemplary embodiment, lower harvest ring 9 is fixed, and upper harvest ring 8 is moved. However, the present disclosure is not limited to this configuration. Specifically, upper harvest ring 8 and lower harvest ring 9 may be moved relatively to each other, and, for example, upper harvest ring 8 may be fixed and lower harvest ring 9 may be moved, or both upper harvest ring 8 and lower harvest ring 9 may be moved. With any of such configurations, as illustrated in FIG. 16, even in a case where another fruit 56 comes into contact with collection box 10, upper harvest ring 8 and lower harvest ring 9 can be protruded in the right direction on the paper surface of FIG. 16 (the direction toward the branch). As a result, it is easy to insert fruit 50 into upper harvest ring 8 and lower harvest ring 9, and it is possible to let fruit 50 pass through collection box 10 by relatively pulling upper harvest ring 8 with respect to lower harvest ring 9 to the left side on the paper surface of FIG. 16 (the direction opposite to the branch).

In addition, such a configuration of upper harvest ring 8 and lower harvest ring 9 causes a pulling force to more reliably act on abscission layer 54, and a decrease in commercial value such as loss of calyx 51 or occurrence of damage hardly occurs.

In addition, in harvesting device 100 according to the present exemplary embodiment, motor 34 and the like are provided to set an attitude and position with respect to a fruit, but these functions may be realized by an appropriate manipulator arm.

In the above exemplary embodiment, an example has been described in which the object, which is fruit 50, has grown on a branch; however, a fruit grown on a plant may be harvested as an object. In this case, the drive mechanism may move lower harvest ring 9 in the direction of the plant on which the object has grown or may move upper harvest ring 8 away from the plant on which the object has grown.

In a case where, harvesting is performed by the cutting operation on the basis of the result of the determination in step S3, harvesting device 100 performs a process of steps S5 and S6.

In step S5, when harvesting device 100 drives motor 11 (see FIG. 4) and motor 17 (see FIG. 5), as shown in FIGS. 18 and 19, upper harvest ring 8 is retracted along guide groove 12 (see FIG. 4) by arm 13 (see FIG. 4), and lower harvest ring 9 is retracted along guide groove 18 (see FIG. 5) by arm 19 (see FIG. 5). As a result, pedicel 58 moves to cutting position 63, being pulled toward cutting blade 31 by upper harvest ring 8 and lower harvest ring 9.

In step S6, when harvesting device 100 drives motor 23 (see FIG. 6), cutting blade 31 operates to cut pedicel 58 pulled to cutting position 63.

After that, harvested fruit 57 having calyx 59 falls and enters collection box 10 in FIG. 1. In a case where harvesting device 100 is caused to function as a harvesting system, it is desirable to dispose a container or the like for collecting harvested fruit 57 like collection box 10.

With the harvesting device of the present disclosure, it is possible to harvest all the objects grown on a bunch.

The harvesting device of the present disclosure can be applied to harvesting various fruits and the like.

What is claimed is:

1. A harvesting device comprising:
    an upper harvest ring that an object grown on a plant is to be inserted into;
    a lower harvest ring that is disposed below the upper harvest ring and that the object is to be inserted into;
    a cutting blade;
    and
    a controller,
    wherein the controller determines one of a first harvest operation and a second harvest operation, the first harvest operation includes a cutting operation by the cutting blade, and the second harvest operation includes a plucking operation by the upper harvest ring and the lower harvest ring, and wherein the controller determines the one of the first harvest operation and the second harvest operation based on an angle of a peduncle of the object.

2. The harvesting device according to claim 1, further comprising:
    a first drive mechanism that moves at least one of the upper harvest ring and the lower harvest ring,
    wherein the controller controls the first drive mechanism based on the determined harvest operation.

3. The harvesting device according to claim 2, wherein when the controller determines the first harvest operation, the controller controls the first drive mechanism to cause the upper harvest ring and the lower harvest ring to move in a direction away from the plant in a state where a part of the object is located in the upper harvest ring and the lower harvest ring.

4. The harvesting device according to claim 3, further comprising:
    a second drive mechanism that drives the cutting blade,
    wherein the controller causes the second drive mechanism to drive the cutting blade after the upper harvest ring and the lower harvest ring move in the direction away from the plant.

5. The harvesting device according to claim 4, wherein when viewed from above the harvesting device, the cutting blade is disposed in an interior of the upper harvest ring and the lower harvest ring.

6. The harvesting device according to claim 2, wherein the cutting blade is disposed in a direction away from the plant on which the object has grown in the direction of movement caused by the first drive mechanism.

7. The harvesting device according to claim 3, wherein when the controller determines the second harvest operation, the controller controls the first drive mechanism to cause the upper harvest ring and the lower harvest ring to change a relative position between the upper harvest ring and the lower harvest ring in a state where a part of the object is located in the upper harvest ring and the lower harvest ring.

8. The harvesting device according to claim 1, wherein
    the object is connected to a main stem of a plant via the peduncle,
    the main stem includes a first peduncle and a second peduncle,
    the first peduncle and the second peduncle form an angle,
    the control device is configured to determine whether the angle is less than or equal to a threshold,
    the control device is configured to harvest the object by the second harvesting operation when the angle is less than or equal to the threshold, and to harvest the object by the first harvesting operation when the angle is greater than or equal to the threshold.

9. The harvesting device according to claim 8, wherein the threshold is 60° to 150°.

10. The harvesting device according to claim 1, wherein the upper harvesting ring and the lower harvesting ring have a curve with a U-shaped structure at their ends.

11. The harvesting device according to claim 10, wherein the upper harvesting ring and the lower harvesting ring are stacked, and the U-shaped structure of the upper harvesting ring and the U-shaped structure of the lower harvesting ring are arranged in the same direction.

* * * * *